Dec. 6, 1966   J. D. AINSWORTH   3,290,578
MULTI-PHASE CONVERTER INCLUDING A HARMONIC FILTER
Filed April 1, 1963

Inventor:
John Desmond Ainsworth
By: Stevens, Davis, Miller + Mosher
Attorneys

United States Patent Office 3,290,578
Patented Dec. 6, 1966

3,290,578
MULTI-PHASE CONVERTER INCLUDING A HARMONIC FILTER
John Desmond Ainsworth, Stafford, England, assignor to The English Electric Company Limited, London, England, a British company
Filed Apr. 1, 1963, Ser. No. 269,479
Claims priority, application Great Britain, Apr. 6, 1962, 13,410/62
4 Claims. (Cl. 321—9)

This invention relates to electrical harmonic filters and to electrical apparatus, for example, mercury-arc convertor installations incorporating such filters.

According to one aspect, the invention consists in an electrical harmonic filter for connection across a transmission line carrying an electrical signal having an alternating component, comprising a circuit having at least two parallel arms, tuned to different harmonics of the fundamental frequency of said signal component, a capacitative reactance connected in parallel with said circuit and of such electrical parameter that it is in parallel resonance with said circuit at a frequency which is higher than the resonance frequency $f$ of that arm which is tuned to the higher or highest of said different harmonics and does not coincide with a harmonic of said fundamental frequency higher than said frequency $f$.

According to another aspect, the invention consists in a convertor installation arranged for the exchange of power between an A.C. and a D.C. system, wherein a harmonic filter according to the preceding paragraph is connected across the or each phase of said A.C. system, across the or each phase of said A.C. system and the D.C. terminals, or across the D.C. terminals alone, said filter connected across the D.C. terminals presenting a low impedance to the lowest D.C. ripple frequency.

According to another aspect, the invention consists in a convertor installation arranged for the exchange of power between a multiphase A.C. and a D.C. system, said convertor comprising a bridge circuit having a plurality of controlled rectifying devices, and a transformer connected between the A.C. system and said devices, wherein a harmonic filter according to the penultimate paragraph is connected across each phase of primary, secondary or tertiary windings of said transformer.

Preferred embodiments of a filter according to the invention and various arrangements of electrical apparatus, in the form of mercury-arc convertor installations, containing such filters will now be described, by way of example, with reference to the accompanying drawings. In the drawings.

Figure 1:
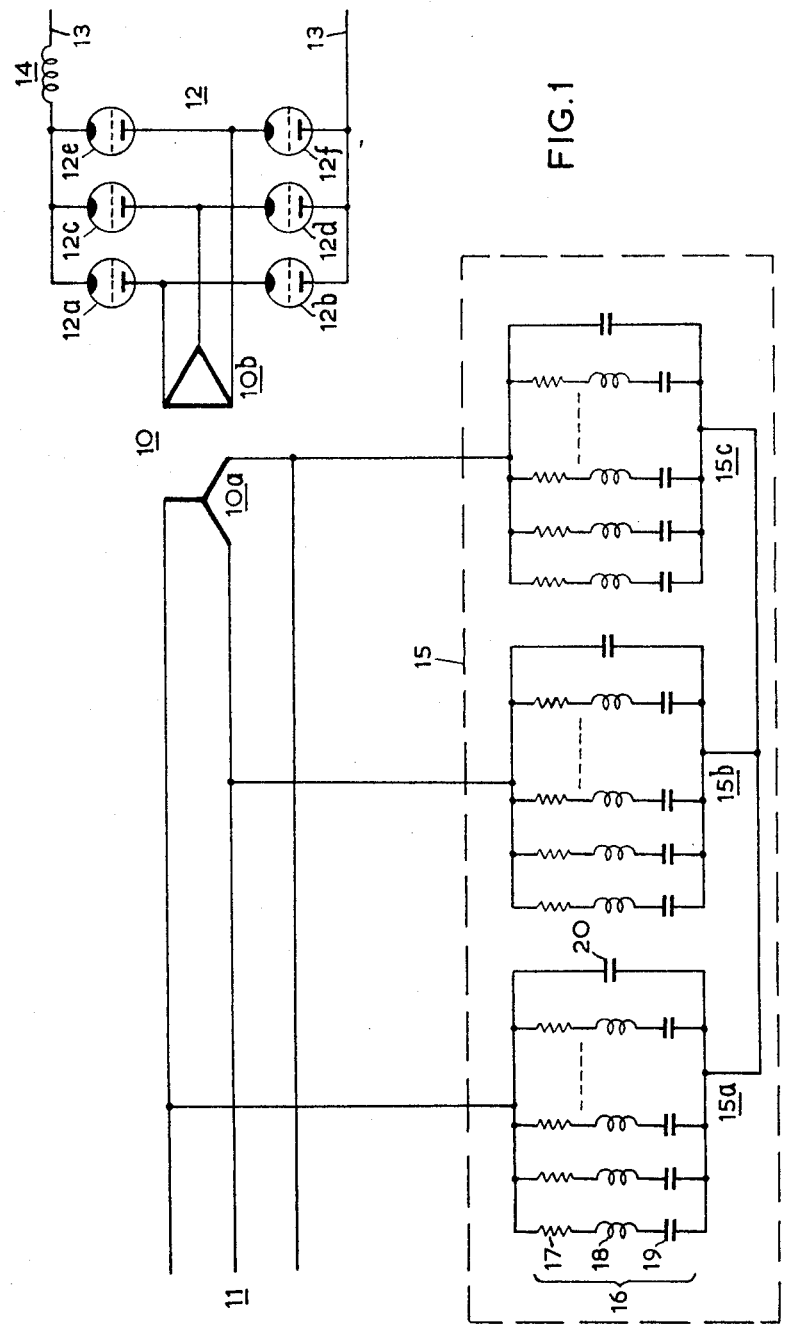
FIG. 1 is a circuit diagram of the basic components of a 3-phase mercury-arc convertor installation including a filter according to the invention.

In the convertor installation shown in FIG. 1, a 3-phase star-delta connected transformer 10 has its star-connected winding 10a connected to a 3-phase A.C. supply 11 and its delta-connected winding 10b connected to a 3-phase mercury-arc convertor bridge 12, consisting of six valves 12a–12f. The convertor bridge 12 is connected to a D.C. line 13 through a smoothing choke 14.

A three-phase harmonic "comb" filter 15 is connected across the winding 10a of the transformer 10; the filter 15 has one branch per phase, the three identical branches 15a–15c being star-conected. Each branch such as 15a has a plurality of parallel arms such as 16, each of which consists of a resistance 17, an inductance 18 and a capacitance 19 connected in series. In addition, each branch has a capacitive reactance 20 connected in parallel with the said arms.

The inductance 18 and capacitance 19 of one arm of each branch of the filter are arranged for this arm to resonate at the lowest harmonic expected to occur which is usually the 5th harmonic. Likewise the inductances and capacitances of the other arms are arranged for the respective arms to resonate at the next higher expected harmonics, such as the 7th, 11th, 13th, 17th, 19th, 23rd and 25th harmonic.

The capacitative reactance 20 of each branch of the filter is arranged so that it is in parallel resonance with the remainder of its branch at a frequency intermediate the highest harmonic frequency for which a resonant arm is provided and the frequency of the next higher harmonic expected. Thus, if the highest harmonic to which an arm 16 is tuned is the 25th, the next higher harmonic expected to occur is the 29th and the fundamental frequency of the A.C. supply 11 is 50 c.p.s., the three capacitative reactances 20 are each made of such a value that each branch 15a–15c of the filter 15 resonates at a frequency greater than 1250 c.p.s. and less than 1450 c.p.s.

Figure 2:
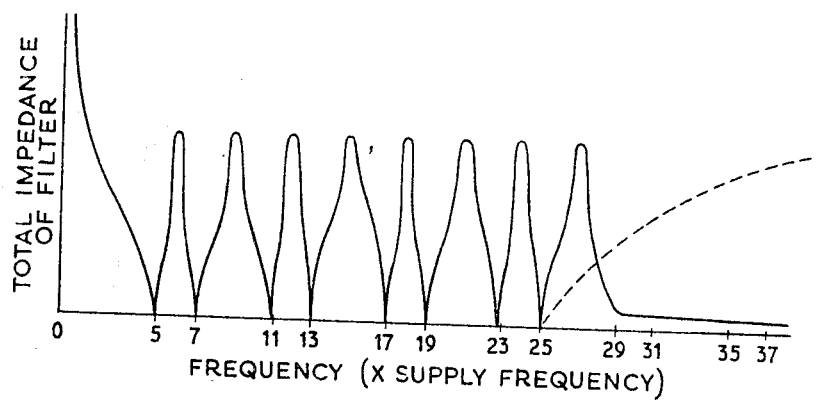
FIG. 2 shows the impedance-frequency characteristic of the filter.

The effect of the capacitative reactance 20, and hence one of the advantages of the filter according to the invention, is shown in FIG. 2. It will be seen that the filter presents a low impedance to the expected harmonics above the highest harmonic to which an arm 16 is tuned, such as the 29th, 31st, 35th and 37th harmonic. For comparison, the dotted line shows the impedance characteristic over the last-mentioned range of higher harmonics for a filter not provided with the capacitative reactance 20.

Whilst these higher harmonics may, of course, be filtered out by providing further arms 16, each tuned to one of these higher harmonics, and whilst the sizes of the components of these arms may be progressively reduced as the harmonic number increases, there is nevertheless a practical economic limit to the number of such arms to be provided. The filter according to the invention thus provides a technically acceptable and considerably less expensive device for filtering out these higher harmonics.

The number of parallel arms such as 16 to be provided for dealing with specific ones of the lower harmonics depends on the extent to which these harmonics are present in the A.C. wave form and the degree to which it is necessary or desirable to eliminate them in any particular installation.

In a practical case, resistors, such as the resistors 17, will usually unavoidably be present, and these may be deliberately increased to a small extent for greater damping of transients at the expense of higher effective filter impedance at the expected harmonic frequencies.

In practice, with the filter connected as shown in FIG. 1, it is found that the voltage at the points of connection of the filter to the A.C. supply 11 and the current in the A.C. system are substantially sine-waves at fundamental frequency. Moreover, the effective commutating reactance of the converter is virtually the transformer leakage reactance only, and does not include that of the A.C. supply, which may therefore be of high impedance if desired. Furthermore, the net leading reactive power required to provide, for example, unity power factor at the points of connection of the filter is partly or wholly supplied by the leading current drawn by the filter at fundamental frequency, and is moreover less than the value which would be required by a synchronous or static capacitor alone instead of the filter.

Figure 3:
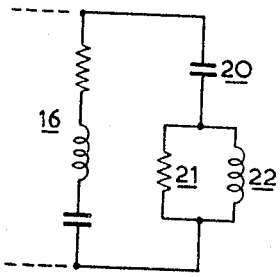
FIG. 3 shows a modification of a filter according to the invention.

If desired, as shown in FIG. 3, a resistor 21 may be connected in series with the capacitor 20 which should have a value such that it reduces the total impedance of the filter at the highest harmonic to which an arm such as 16 of the filter is tuned, viz: in the example shown, the peak between the 25th and 29th harmonic in FIG. 2. Adjacent peaks will thereby also be reduced to some extent. This resistor 21 is also valuable in reducing the oscillatory peak transient voltages obtained across the filter due, for example, to opening or closing a circuit breaker in the supply 11. In practice the power dissipation in such a resistor due to current in the capacitor 20 at the fundamental frequency, may be excessive, and this may be reduced by the provision of an inductor 22 connected across this resistor. This inductor, however, must not be so small as to appreciably change the damping effect of the resistor 21.

In an alternative arrangement, the filter 15 may be connected across the terminals of the winding 10b of the transformer (viz: the A.C. terminals of the converter 12) the arrangement being otherwise as in FIG. 1.

In this arrangement with an ideal filter, the convertor commutating reactance is theoretically zero, so that its commutation or overlap angle is zero and its power factor can approach unity. The current flowing in the transformer and A.C. system is then a sine wave, and moreover can be either at unity power factor or at leading power factor if the reactive power of the filter is sufficient. In the latter case the terminal voltage of the transformer winding 10b may be equal to or greater than the terminal voltage of the winding 10a (on the basis of a 1:1 transformation ratio) and the size of the transformer may be reduced by, say 5% or more, compared with that required in the usual arrangements. With practical filters according to the invention, these conditions may be approached.

The reverse voltage of the valves of the converter 12 at their current zero may be of very small amplitude at small firing angles, though its rate of rise is rapid. At convertor grid firing angles of the order of 90°, the recovery voltage amplitude becomes large and its rise time may be excessively small causing valve backfire. For this reason this last mentioned arrangement is less desirable.

Figure 4:
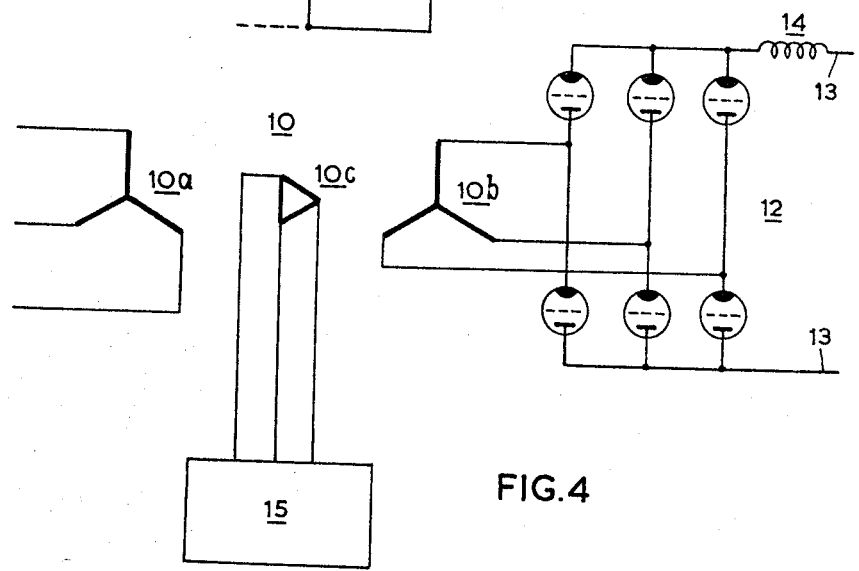
FIG. 4 shows a mercury-arc convertor installation in which a filter according to the invention is connected to a tertiary winding of a transformer.

As a further alternative to the arrangement shown in FIG. 1, the filter 15 may be connected to a tertiary winding 10c on the transformer 10, as shown in FIG. 4.

The main advantages of the use of such a tertiary winding for this purpose are that this winding may be designed to work at a lower voltage than the other windings in, for example, a high voltage system, resulting in cheaper switchgear and the possibility of providing a synchronous capacitor in parallel with the filter to augment the reactive power.

Figure 5:
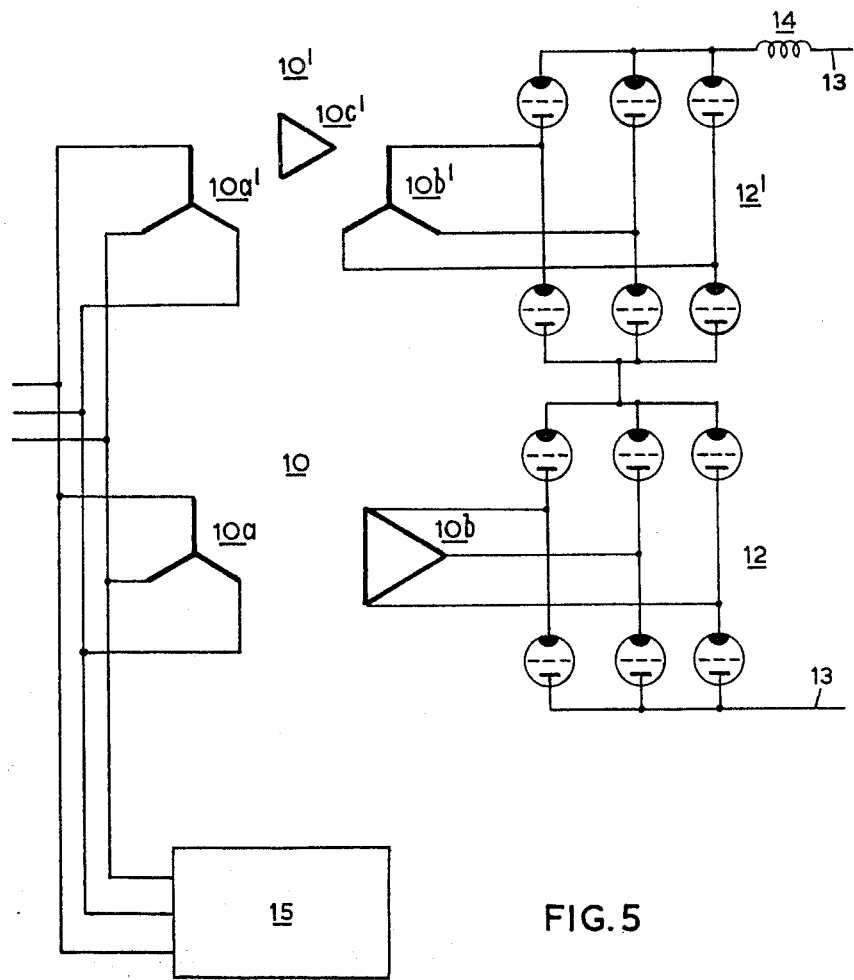
FIG. 5 shows a multi-bridge mercury-arc convertor installation.

In FIGURE 5 a filter according to the invention is provided in a mercury-arc convertor installation having two convertor bridges 12, 12' connected in series on the D.C. side, the corresponding primary windings 10a, 10a' of transformers 10, 10' being connected in parallel. In this installation the transformers 10, 10' are arranged with staggered phase vectors, so that the resultant currents in the A.C. system contain only the 11th, 13th, 23rd, 25th, etc., harmonics, in addition to the desired fundamental frequency.

By "staggered phase vectors" is meant an arrangement in which the groups of vectors of the voltages in n transformer windings each having p phases, are relatively displaced in phase by 360/2 np degrees.

Thus, where two 3-phase transformers 10, 10' are used, this relative phase displacement must be 30° and this is conveniently obtained by using star-connected windings 10b' and delta-connected windings 10b, the star-star transformer 10' employing a tertiary delta-winding 10c'. Alternatively, each transformer may be provided with a tertiary winding which may be connected together, the filter then being connected across them, or an inter-star or zig-zag arrangement may be employed. The tertiary reactance should preferably be approximately zero.

In such a 2-convertor bridge arrangement, the two bridges tend to produce mutual interference when operating as invertors, since at certain instances in the cycle the transient current change in one bridge causes resulting transient voltages on the A.C. side of the system due to the common A.C. system impedance, these transient voltages being transferred to the other transformer and tending to cause premature firing of the valves of the convertor connected to it.

With ordinary filters this phenomenon leads to repeated commutation failure and may, in fact, make operation impossible. This defect is avoided or at least substantially reduced by the use of a filter according to the invention connected to the common point in the A.C. system, since the lower frequency resonant arms deal with the bulk of the transients and the capacitative reactance such as 20, suppresses the fast transient components without giving rise to undesired oscillations.

A filter according to the invention, viz: one branch such as 15a in FIG. 1 may also be connected across the D.C. line 13 to reduce harmonic interference on this side of the installation; it has negligible effect on the convertor performance if the choke 14 is used between the convertor 12 and the D.C. line 13.

In this case the expected current harmonics are of frequencies 6, 12, 18, etc., times the fundamental supply frequency if one bridge such as 12 is used. Resonant arms, such as 16, may, for example, be used for and therefore tuned to, the 6th and 12th harmonics, and the capacitative reactance 20 arranged for parallel resonance with the remainder of the filter at a frequency of about 15 times the fundamental supply frequency.

Although converters have been described and illustrated employing grid-controlled mercury-arc valves, it will be understood that other triggered rectifying devices may alternatively be used, e.g., semiconductor gated diodes.

I claim:

1. A converter installation for the exchange of power between a multi-phase A.C. system, operating at a predetermined fundamental frequency, and a D.C. system, said converter installation comprising
   a plurality of controlled rectifying devices connected together as a bridge circuit,
   a multi-phase transformer connected between the A.C. system and said devices, said transformer comprising multi-phase primary, secondary and tertiary windings, and
   a harmonic filter connected across the said tertiary winding for substantially removing a plurality of predetermined harmonics of the said predetermined fundamental frequency, the harmonic filter comprising
   a plurality of filter branches respectively connected across the phases of the said tertiary winding; each filter branch comprising
   a plurality of tuned circuits connected in parallel with each other, which plurality is less than the plurality of predetermined harmonics to be removed by the filter, each tuned circuit being tuned to a different said predetermined harmonic, and
   a capacitive reactance connected in parallel with all the said tuned circuits of the filter branch, said capacitive reactance being in parallel resonance with all the said tuned circuits in the filter branch at a frequency between the highest one of the said harmonics to which any said tuned circuit is tuned and the next higher one of the said predetermined harmonics.

2. A multi-phase converter installation for the exchange of electrical power between a multi-phase A.C. system operating at a predetermined fundamental frequency and a D.C. system, the converter installation comprising
a multi-phase transformer having a primary winding and a secondary winding,
a plurality of controlled rectifying devices connected together as a bridge circuit,
means connecting the said bridge circuit between the said secondary winding and the said D.C. system,
means connecting the said primary winding to the said A.C. system, and
a harmonic filter for substantially removing each one of the harmonics of the said predetermined fundamental frequency in the series 5th, 7th, 11th, 13th, 17th, 19th, 23rd, 25th . . . harmonics, the said harmonic filter comprising
a plurality of filter branches each connected across a respective said phase of the A.C. system, and each said filter branch comprising
a pluarlity of parallel-connected tuned circuits, which plurality is less than the number of said harmonics in the said series, each tuned circuit being tuned to a respective one of the said harmonics,
each filter branch also including a capacitive reactance connected in parallel with all the tuned circuits of the branch,
said capacitive reactance being arranged to be in parallel resonance with all the said tuned circuits in the branch at a frequency between the highest one of the said harmonics to which any said tuned circuit is tuned and the next higher one of the said harmonics in the series.

3. A multi-phase converter installation for the exchange of power between an A.C. system operating at a predetermined fundamental frequency and a D.C. system, the converter installation comprising
a multi-phase transformer having a primary winding and a secondary winding,
a plurality of controlled rectifying devices connected together as a bridge circuit,
means connecting the said bridge circuit between the said secondary winding and the said D.C. system,
means connecting the said primary winding to the said A.C. system, and
a harmonic filter connected across the said D.C. system for substantially removing each one of a plurality of predetermined D.C. ripple signals harmonically related to the said fundamental frequency of the A.C. system, the harmonic filter including
a plurality of tuned circuits connected in parallel, which plurality is less than the said plurality of D.C. ripple signals, each tuned circuit being tuned to the frequency of a respective one of the said predetermined D.C. ripple signals, and
a capacitive reactance connected in parallel with all the said tuned circuits,
the said capacitive reactance being arranged to be in parallel resonance with all the said tuned circuits at a frequency between the highest frequency to which any said tuned circuit is tuned and the frequency of the next higher frequency D.C. ripple signal.

4. A converter installation for the exchange of power between a multi-phase A.C. system operating at a predetermined fundamental frequency and a D.C. system, said converter installation comprising
a plurality of controlled rectifying devices connected together as a first bridge circuit,
a plurality of further controlled rectifying devices connected together as a second bridge circuit,
first and second multi-phase transformers respectively connected between the A.C. system and corresponding ones of said first and second bridge circuits, each transformer having a primary, a secondary, and a tertiary winding, the tertiary windings of the two transformers being connected together, and
a harmonic filter connected across each said tertiary winding for substantially removing a plurality of predetermined harmonics of the said predetermined fundamental frequency, the harmonic filter comprising
a plurality of filter branches respectively connected across the phases of the respective said tertiary winding, each filter branch comprising
a plurality of tuned circuits connected in parallel with each other, which plurality is less than the said plurality of predetermined harmonics to be removed, each tuned circuit being tuned to a respective one of the said predetermined harmonics, and
a capacitive reactance connected in parallel with all the said tuned circuits of the filter branch,
said capacitive reactance being in parallel resonance with all the said tuned circuits in the filter branch at a frequency between the highest one of the said harmonics to which any said tuned circuit in the filter branch is tuned and the next higher one of the said predetermined harmonics.

References Cited by the Examiner

UNITED STATES PATENTS

| 2,015,534 | 9/1935 | Rose | 321—10 X |
| 2,820,189 | 1/1958 | Uhlman | 321—9 |
| 2,942,197 | 6/1960 | Madsen et al. | 333—76 X |
| 3,038,134 | 6/1962 | Forssell | 333—79 |

FOREIGN PATENTS 446,223  1936  Great Britain.

JOHN F. COUCH, *Primary Examiner.*

LLOYD McCOLLUM, *Examiner.*

W. H. BEHA, *Assistant Examiner.*